United States Patent
Hullfish et al.

(10) Patent No.: US 7,428,580 B2
(45) Date of Patent: *Sep. 23, 2008

(54) ELECTRONIC MESSAGE FORWARDING

(75) Inventors: Keith C. Hullfish, Snohomish, WA (US); Charles A. Carey, Kirkland, WA (US); Michael R. Longé, Seattle, WA (US); Joe Parr, Redmond, WA (US)

(73) Assignee: AOL LLC, Dulles, VA (US)

( * ) Notice: Subject to any disclaimer, the term of this patent is extended or adjusted under 35 U.S.C. 154(b) by 369 days.

This patent is subject to a terminal disclaimer.

(21) Appl. No.: 10/723,040

(22) Filed: Nov. 26, 2003

(65) Prior Publication Data

US 2005/0114533 A1    May 26, 2005

(51) Int. Cl.
*G06F 15/16* (2006.01)
(52) U.S. Cl. .................................. 709/207; 455/466
(58) Field of Classification Search ......... 709/205–206, 709/207; 455/466
See application file for complete search history.

(56) References Cited

U.S. PATENT DOCUMENTS

| | | | |
|---|---|---|---|
| 6,212,548 B1 * | 4/2001 | DeSimone et al. | 709/204 |
| 6,334,111 B1 | 12/2001 | Carrott | 705/14 |
| 6,405,035 B1 | 6/2002 | Singh | 455/414 |
| 6,430,602 B1 | 8/2002 | Kay et al. | 709/206 |
| 6,483,913 B1 | 11/2002 | Smith | 379/368 |
| 6,512,930 B2 * | 1/2003 | Sandegren | 455/518 |
| 6,539,421 B1 | 3/2003 | Appelman et al. | 709/206 |
| 6,714,793 B1 * | 3/2004 | Carey et al. | 455/466 |
| 6,757,365 B1 * | 6/2004 | Bogard | 379/88.17 |

(Continued)

FOREIGN PATENT DOCUMENTS

EP    1104964    6/2001

(Continued)

OTHER PUBLICATIONS

Ellen Isaacs, Alan Walendowski, Dipti Ranganathan Communications of the ACM vol. 45, No. 9 (Sep. 2002), pp. 68-72.*

(Continued)

*Primary Examiner*—Jason Cardone
*Assistant Examiner*—Ajay Bhatia
(74) *Attorney, Agent, or Firm*—Michael A. Glenn; Glenn Patent Group (57) ABSTRACT

The invention provides a method of transmitting electronic messages in a computer environment. The preferred embodiment receives an electronic message addressed to a telephone number and determines an instant message identifier associated with the telephone number. In response to the determination that an instant message identifier associates with the telephone number, it is further determined whether an instant message receiver is available to receive messages addressed to the instant message identifier. In response to a determination that an instant message receiver is available to receive instant messages addressed to the instant message identifier, the electronic message is forwarded as an instant message addressed to the instant message identifier. In response to a determination that an instant message receiver is available to receive instant message addressed to the instant message identifier, electronic message is sent to a mobile device at the telephone number in response to a determination that no instant message receiver is available to receive instant messages addressed to the instant message identifier.

59 Claims, 8 Drawing Sheets

U.S. PATENT DOCUMENTS

| | | | |
|---|---|---|---|
| 6,760,580 B2 * | 7/2004 | Robinson et al. | 455/412.2 |
| 6,801,659 B1 | 10/2004 | O'Dell | |
| 6,898,626 B2 * | 5/2005 | Ohashi | 709/206 |
| 6,957,077 B2 * | 10/2005 | Dehlin | 455/466 |
| 7,016,978 B2 * | 3/2006 | Malik et al. | 709/246 |
| 7,020,849 B1 | 3/2006 | Chen | |
| 7,113,803 B2 * | 9/2006 | Dehlin | 709/217 |
| 7,190,956 B2 * | 3/2007 | Dorenbosch et al. | 709/206 |
| 7,231,428 B2 * | 6/2007 | Teague | 709/206 |
| 2001/0003202 A1 * | 6/2001 | Mache et al. | 713/153 |
| 2001/0003203 A1 * | 6/2001 | Mache | 713/201 |
| 2001/0034224 A1 | 10/2001 | McDowell et al. | 455/412 |
| 2001/0048735 A1 * | 12/2001 | O'Neal | 379/88.13 |
| 2002/0007398 A1 * | 1/2002 | Mendiola et al. | 709/206 |
| 2002/0035605 A1 | 3/2002 | McDowell et al. | 709/206 |
| 2002/0065828 A1 * | 5/2002 | Goodspeed | 707/100 |
| 2002/0071539 A1 * | 6/2002 | Diament et al. | 379/202.01 |
| 2002/0087704 A1 | 7/2002 | Chesnais et al. | 709/228 |
| 2002/0130904 A1 | 9/2002 | Becker et al. | 345/753 |
| 2002/0136390 A1 | 9/2002 | Lang et al. | 379/222 |
| 2002/0155826 A1 * | 10/2002 | Robinson et al. | 455/412 |
| 2002/0174260 A1 | 11/2002 | Huang | 709/313 |
| 2003/0087632 A1 * | 5/2003 | Sagi et al. | 455/414 |
| 2003/0179930 A1 | 9/2003 | O'Dell et al. | |
| 2004/0064586 A1 | 4/2004 | Weigand | |
| 2004/0078445 A1 * | 4/2004 | Malik | 709/206 |
| 2004/0092273 A1 * | 5/2004 | Valloppillil | 455/466 |
| 2004/0141599 A1 * | 7/2004 | Tang et al. | 379/93.24 |
| 2004/0152477 A1 * | 8/2004 | Wu et al. | 455/466 |
| 2004/0157586 A1 * | 8/2004 | Robinson et al. | 455/412.1 |
| 2004/0171396 A1 * | 9/2004 | Carey et al. | 455/466 |
| 2004/0198351 A1 * | 10/2004 | Knotts | 455/432.1 |
| 2004/0204068 A1 * | 10/2004 | Komaki | 455/556.1 |
| 2005/0009541 A1 * | 1/2005 | Ye et al. | 455/466 |
| 2005/0125559 A1 * | 6/2005 | Mutha | 709/245 |
| 2005/0208957 A1 * | 9/2005 | Knotts | 455/466 |
| 2005/0223075 A1 * | 10/2005 | Swearingen et al. | 709/207 |
| 2006/0026237 A1 * | 2/2006 | Wang et al. | 709/206 |
| 2006/0116139 A1 * | 6/2006 | Appelman | 455/466 |
| 2006/0149644 A1 * | 7/2006 | Sulmar et al. | 705/34 |
| 2006/0168204 A1 * | 7/2006 | Appelman et al. | 709/224 |
| 2006/0271687 A1 * | 11/2006 | Alston et al. | 709/227 |

FOREIGN PATENT DOCUMENTS

| | | |
|---|---|---|
| EP | 1104965 | 6/2001 |
| EP | 1207655 | 5/2002 |
| EP | 1213874 | 6/2002 |
| EP | 1237384 | 9/2002 |
| EP | 1248484 | 10/2002 |
| EP | 1248486 | 10/2002 |
| EP | 1255414 | 11/2002 |
| EP | 1274222 | 1/2003 |
| KR | 1020010012984 | 3/2001 |
| WO | WO 02/077840 | 3/2002 |
| WO | 02/073886 | 9/2002 |
| WO | 03/021929 | 3/2003 |
| WO | WO 2004/111812 | 12/2004 |
| WO | WO 2004/111871 | 12/2004 |
| WO | WO 2006/026908 | 3/2006 |

OTHER PUBLICATIONS

Mobile Electronic Commerce: Reintermediation in the Payment System J. Felix Hampe et al.☐☐Electronic Commerce: The End of the Beginning 13th International Bled Electronic Commerce Conference Bled, Slovenia, Jun. 19-21, 2000.* iSMS: An Integration Platform forShort Message Service and IP Networks Herman Chung-Hwa Rao, ATT Laboratories-Research, Di-Fa Chang, University of Southern California, Yi-Bing Lin, National Chiao Tung University, IEEE Network • Mar./Apr. 2001.*

Instant messaging in teen life, Grinter, R.E. and Palen, L., Proceedings of the 2002 ACM conference on Computer supported cooperative work, pp. 21-30, 2002,ACM Press New York, NY, USA.*

Mitsuoka, M.; Watanabe, S.; Kakuta, J.; Okuyama, S., "Instant messaging with mobile phones to support awareness," Applications and the Internet, 2001. Proceedings. 2001 Symposium on , vol., no.pp. 223-230, 2001.*

ConNexus to awarenex: extending awareness to mobile users, Tang, J.C. and Yankelovich, N. and Begole, J. and Van Kleek, M. and Li, F. and Bhalodia, J., Proceedings of the SIGCHI conference on Human factors in computing systems, pp. 221-228, 2001, ACM Press New York, NY, USA.*

Way-bac machine, handspring tero 270, Jun. 1, 2002.*

M. Day, S. Aggarwal, G. Mohr, J. Vincent, RFC 2279 Instant Messaging/ Presence Protoocl Requirements, Feb. 2000.*

International Standard, Information technology—Telecommunications and information exchange between systems- Private Integrated Services Network—Specifications, functional model and information flows—SHort message service, ISO/IEC 21989, Jul. 1, 2002.*

Bonnie A. Nardi, Steve Whittaker, Erin Bradner, Interaction and outeraction: instant messaging in action, CSCW'00, Dec. 2-6, 2000, Philadelphia, PA.*

Chung-Hwa Rao, H.; Di-Fa Chang; Yi-Bing Lin, "iSMS: an integration platform for short message service and IP networks," Network, IEEE , vol. 15, No. 2, pp. 48-55, Mar./Apr. 2001.*

Schulzrinne, H.; Rosenberg, J., "The Session Initiation Protocol: Internet-centric signaling," Communications Magazine, IEEE, vol. 38, No. 10, pp. 134-141, Oct. 2000.*

Milewski, A. E. and Smith, T. M. 2000. Providing presence cues to telephone users. In Proceedings of the 2000 ACM Conference on Computer Supported Cooperative Work (Philadelphia, Pennsylvania, United States). CSCW '00. ACM, New York, NY, 89-96.*

Tang, J.C., Yankelovich, N., Begole, J., Van Kleek, M., Li, F., and Bhalodia, J. 2001. ConNexus to awarenex: extending awareness to mobile users. In Proceedings of the SIGCHI Conference on Human Factors in Computing Systems (Seattle, Washington, United States). CHI'01. ACM, New York, NY, 221-228.* imForwards.com—FAQ's; Oct. 21, 2003.

imForwards.com; Oct. 21, 2003.

N. Liew Kwek Sing; *AOL ICQ* vs. *MSN Messenger*; Department of Electronic and Computer Science, University of Southampton, 2003.

Ylva Hård af Segerstad et al.; *Instant Messaging and Awareness of Presence in WebWho*; Department of Linguistics, Göteborg University; Sweden, 2001.

Chung-Hwa Herman Rao et al.; *iMobile: A Proxy-Based Platform for Mobile Services*; Network Services Research Center, AT&T Labs—Research, 2001.

G. Reif et al.; *A Web-based Peer-to-Peer Architecture for Collaborative Nomadic Working*; Technical University of Vienna, Distributed Systems Group, Jun. 20, 200.

M. Smith et al.; *Conversation Trees and Threaded Chats*; Collaboration & Multimedia Group, Microsoft Research, Redmond, WA, 2000.

Per E. Pedersen et al.; *Using the Theory of Planned Behavior to Explain Teenager's Adoption of Text Messaging Services*; Agder University College, 2002.

Per E. Pedersen; *The Adoption of Text Messaging Services Among Norwegian Teens: Development and Test of an Extended Adoption Model*; SNF-Report No. 23/02; Samfunns- Og Næringslivsforskning As Bergen, Jun. 2002p.

* cited by examiner

ELECTRONIC MESSAGE FORWARDING

BACKGROUND OF THE INVENTION

1. Technical Field

The invention relates to electronic messaging systems in a computer environment. More particularly, the invention relates to the delivery of an electronic message addressed to a telephone number.

2. Description of Prior Art

The information age has brought various communication tools into every day life. In addition to the traditional telephone and facsimile services, wireless communication systems and electronic messaging systems are popular methods that offer convenience and advantages that the traditional communication devices do not provide. For example, wireless communication systems allow a mobile phone user to be reached on his mobile phone in any places within the geographical area where the wireless telephone services are offered. Electronic messaging systems allow a user to access electronic messages received from the Internet via a computer terminal where he has access to the Internet.

Much effort has been made to enable electronic message delivery and communication across different communication systems, for example, between wireless communication systems and electronic messaging systems via the Internet or between the electronic messaging systems and facsimile services. A unified messaging system attempts to provide a universal message sending and delivery system that allows interoperability among the three typical message types, that is, voice mail, facsimile message, and electronic messaging. Using the unified messaging system, a user can retrieve all three types of messages via a single point of access. For example, a user can access all three types of messages via an electronic message system at a computer terminal or via a telephone system with a telephone number.

The Short Message Services (SMS) is a type of electronic messaging system that allows a mobile phone user to send from one mobile phone a small text message addressed to a telephone number for reception at another mobile phone. Further, a user may send an SMS message to a mobile phone at a telephone number through the Web site of the wireless service provider using a Web browser. Also, a user may send an SMS message to a mobile phone at a telephone number using an Instant Messaging software, like AOL Instant Messenger. The recipient may also be enable to reply from the mobile device using various mechanisms, like using special short codes that route messages to a Screen Name on the Instant Messaging service, like AOL Instant Messenger. An SMS message addressed to a telephone number is typically stored in a central short message center which forwards it to the mobile phone at the telephone number when it is available for communication with the central short message center.

The Instant Message Services (IMS) are a real-time communication process that allows users to exchange instant messages via a user interface over a communication network. Instant messages are typically exchanged when the communication channel between the source and destination devices are established for real-time communication.

However, interoperability between the SMS and the IMS has yet to be achieved. It would be advantageous to provide an electronic message delivery system that bridges both worlds of the SMS and the IMS.

SUMMARY OF THE INVENTION

The invention provides processes and systems for forwarding electronic messages addressed to telephone numbers in a computer environment.

In one embodiment of the invention, a method of transmitting electronic messages in a computer environment includes: receiving an electronic message addressed to a telephone number; determining an instant message identifier associated with the telephone number; determining an instant message receiver is available to receive messages addressed to the instant message identifier; forwarding the electronic message as an instant message addressed to the instant message identifier in response to a determination that an instant message receiver is available to receive instant messages addressed to the instant message identifier; maintain the identity of the telephone number in the message and for any subsequent responses; and sending the electronic message to a mobile device at the telephone number in response to a determination that no instant message receiver is available to receive instant messages addressed to the instant message identifier.

In one example, the electronic message includes one of a text message, an SMS text message, an Multimedia Messaging Services (MMS) message, a video message and an audio message; and the instant message is received at an electronic device configured to receive instant messages addressed to the instant message identifier. For example, the electronic device may be one of: a computer, a personal data assistant (PDA) and a telephone receiver. In one example, the instant message identifier associated with the telephone number is determined through searching in a database. In one example, whether or not to forward the electronic message as an email message addressed to an email address is determined according to a user preference stored in a database. In another example, whether or not to forward the electronic message as an instant message addressed to the instant message identifier is determined according to a user preference stored in a database. In one example, the determination of whether or not to forward is further based on source information of the electronic message, such as: a source address of the electronic message, a user name of a sender of the electronic message, a telephone number of a sender of the electronic message, or an instant message identifier of a sender of the electronic message. In one example, the instant message is generated from the electronic message based on one or more predetermined rules. For example, the one or more predetermined rules may select one or more portions of the electronic message as the instant message and may selectively delete one or more portions of the electronic message to generate the instant message.

In one embodiment of the invention, an apparatus for transmitting electronic messages in a computer environment includes: a module for receiving an electronic message addressed to a telephone number; a module for determining an instant message identifier associated with the telephone number; a module for determining whether an instant message receiver is available to receive messages addressed to the instant message identifier; a module for forwarding the electronic message as an instant message addressed to the equivalent instant message identifier in response to a determination that an instant message receiver is available to receive instant messages addressed to the instant message identifier; and a module for sending the electronic message to a mobile device at the telephone number in response to a determination that no instant message receiver is available to receive instant messages addressed to the instant message identifier.

DETAILED DESCRIPTION OF THE INVENTION

The invention is embodied in an electronic message forwarding system in a computer environment. The invention provides methods and apparati for forwarding electronic messages addressed to telephone numbers as instant messages for the instant message identifiers associated with the corresponding telephone numbers.

In one embodiment of the invention, after an electronic message addressed to a telephone number is received for forwarding, an instant message identifier associated with the telephone number is determined. Then, it is determined whether an instant message receiver is available to receive messages addressed to the instant message identifier. The electronic message is forwarded as an instant message addressed to the instant message identifier in response to a determination that an instant message receiver is available to receive instant messages addressed to the instant message identifier. The identity of the telephone number in the message and for any subsequent responses is maintained. In response to a determination that no instant message receiver is available to receive instant messages addressed to the instant message identifier, the electronic message is forwarded to a mobile device at the telephone number.

In one embodiment, the electronic message is not forwarded to a mobile device at the telephone number when the electronic message is forwarded as an instant message addressed to the instant message identifier, e.g. according to a user preference stored in the database associated with the telephone number.

Alternatively, the electronic message may be forwarded to a mobile device at the telephone number regardless of whether there is an instant message receiver available to receive instant messages addressed to the instant message identifier, e.g. according to a user preference stored in the database associated with the telephone number.

In one embodiment, the electronic message is forwarded as the instant message regardless whether there is an instant message receiver available to receive instant messages addressed to the instant message identifier, e.g. according to a user preference stored in the database associated with the instance message identifier or the telephone number.

Figure 1A:
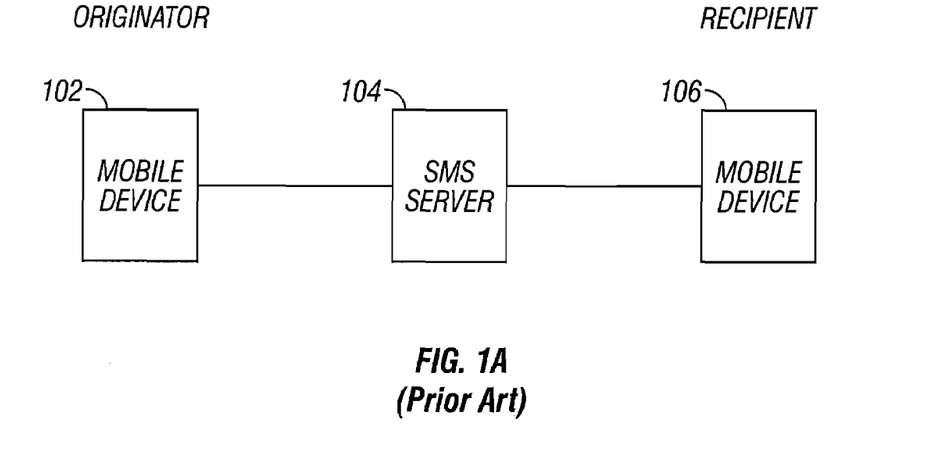
FIG. 1A is a block schematic diagram showing a system that forwards an SMS message to the intended recipient's communication devices according to prior art.

FIG. 1A is a block schematic diagram showing a system that forwards an SMS message to the intended recipient's communication devices according to prior art. Referring now to FIG. 1A, an SMS message originator instructs a mobile phone 102 to send the SMS text message to the recipient's mobile phone 106 by using the destination SMS message address associated with the recipient's mobile phone number 106. The SMS message is received by an SMS server 104. The SMS server 104 further transmits the SMS message to the recipient's mobile phone 106 according to the telephone number designated as the destination address of the SMS message. The recipient receives the SMS message on the mobile phone 106.

Figure 1B:
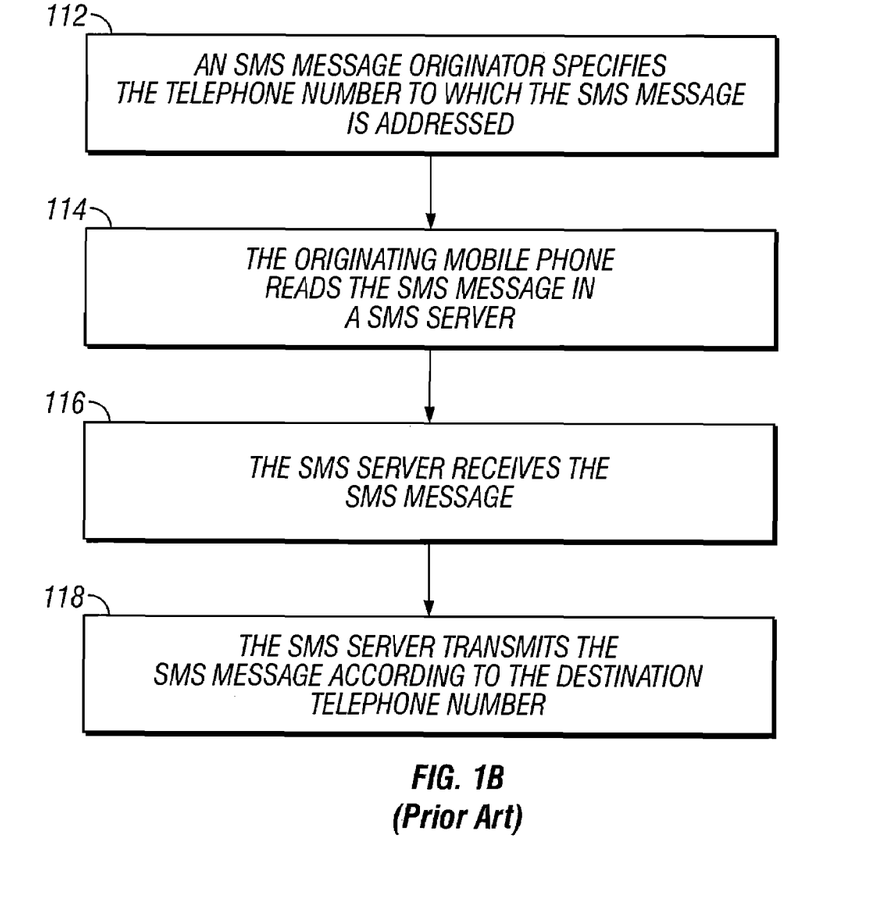
FIG. 1B is a block diagram showing a method of forwarding an SMS message to the intended recipient according to prior art.

FIG. 1B is a block diagram showing a method of forwarding an SMS message to the intended recipient according to prior art. Referring now to FIG. 1B, an SMS message originator specifies the telephone number to which the SMS message is addressed 112. The SMS message originating mobile phone sends the SMS message to a SMS server 114. The SMS server stores the SMS message 116 and further forwards the SMS message according to the destination mobile telephone number of the SMS message 118 when the mobile phone is in communication with the SMS server.

Figure 2:
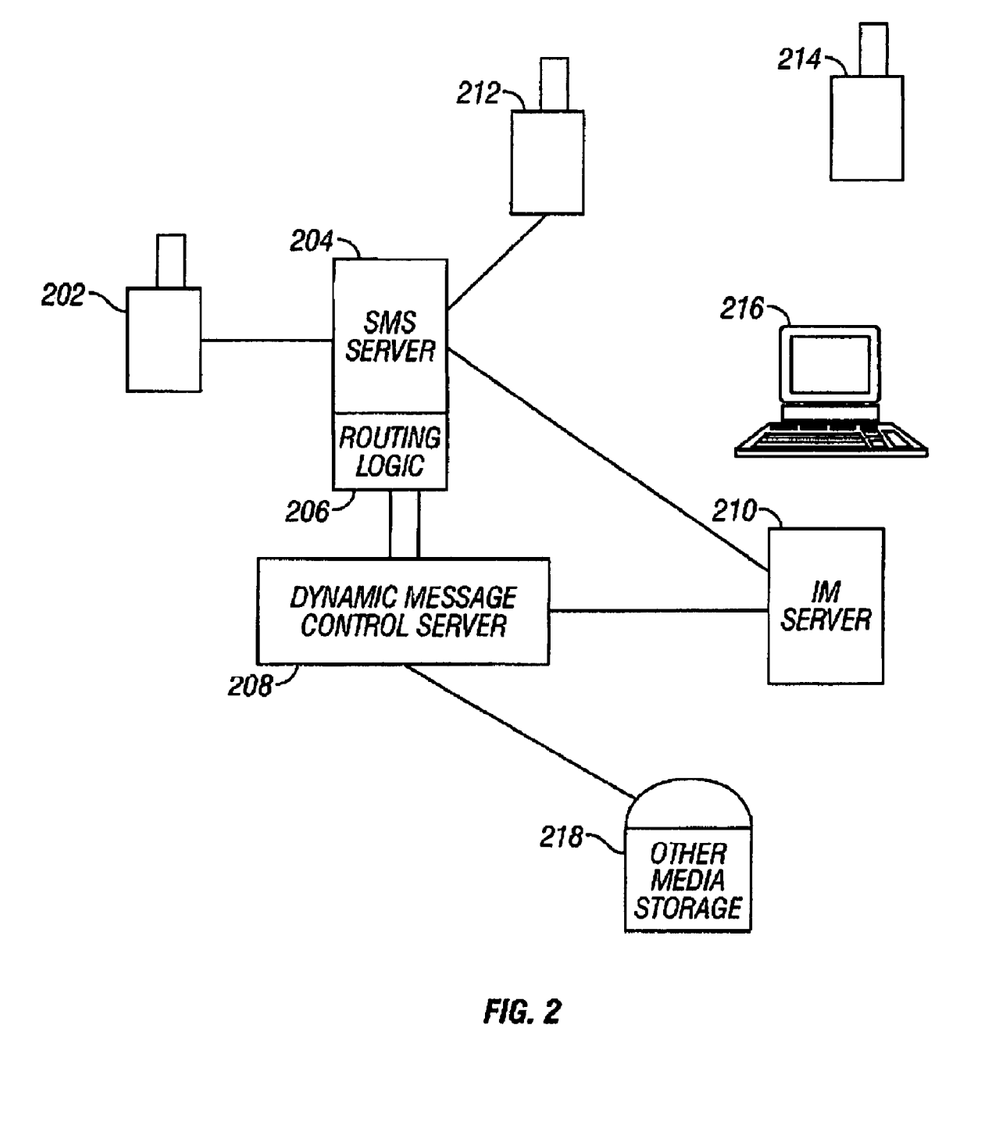
FIG. 2 is a block schematic diagram showing a system for forwarding an SMS message to the destination devices according to one embodiment of the invention.

FIG. 2 is a block schematic diagram showing a system for forwarding an SMS message to the destination device according to one embodiment of the invention. Referring now to FIG. 2, one embodiment of the invention provides a system for forwarding an SMS message to destination devices depending on the real-time presence of the intended recipient. The system according to one embodiment of the invention includes an SMS text message originator 202, an SMS server 204 that includes a routing logic 206, a dynamic message control server 208, an IM server 210, and one or more destination devices 212, 214, 216. One embodiment includes additional media storage 218.

The SMS text message originator ("originator") 202 generates an SMS text message addressed to a telephone number of the recipient mobile devices 212, 214 or an email address of a desktop computer 216. The SMS text message originator 202 can be any SMS generating devices, e.g. an SMS-enabled mobile device, a web-browser or an IM client, that allow to generate and send the SMS text message addressed to the telephone number or the email address.

In one embodiment, after the SMS message sender instructs the originator 202 to send an SMS message to a destination device 212, 214 or 216, the SMS server 204 receives the SMS text message. The SMS server 204 then forwards it to the dynamic message control server 208.

The dynamic message control server 208 makes decisions with regard to various actions that can be taken with the SMS text message, such as whether to forward the SMS message as an instant message, or whether or not to forward the SMS message in its original content. The details of these actions are described below in FIG. 3.

If the dynamic message control server 208 decides that the SMS message should be forwarded as an instant message, the dynamic message control server 208 forwards the SMS message to the IM server 210 to be transmitted further as an instant message. The IM server 210 then forwards the SMS message as an instant message to one or more instant message receivers 214, 216 for the instant message identifier. In one embodiment, the destination device is an IM-enabled mobile device 214 displaying the IM interface. Alternatively, the destination device 216 is a computer terminal displaying an IM interface.

If the dynamic message control server 208 decides that the SMS message should be forwarded as an SMS message through the SMS server 204, the routing logic 206 then forwards the SMS message to the mobile phone number with the addressed telephone number. Alternatively, the dynamic message control server 208 may be implemented inside or with the routing logic 206 in the SMS server 204, or inside the IM server 210, or partially in the SMS server 204 and partially in the IM server 210.

In one embodiment, the destination device is an SMS-enabled mobile device 214. It is understood that different devices may be used to receive different types of electronic messages. For example, the mobile device 214 may be used to receive the SMS messages. The computer terminal 216 may be used to receive the IM messages. The mobile device 214 may also be used to receive the IM messages if IMS-enabled.

In this way, the SMS text message is routed to the destination devices 214, 216 according to the routing path determined by the IM Server 210. The dynamic message control server 208 maintains a database containing the information to map the telephone numbers for the SMS message to corresponding instant message identifiers and user preferences. The user preferences and the mapping between the telephone numbers and the IM identifiers are used by the dynamic message control server 208 to route the SMS messages according to the embodiments of the invention.

In another embodiment, media storage 218 are provided to store various messages. For example, an SMS text message can be forwarded not only to an IM server 210, but also the media storage 218. A message containing a picture can be forwarded to an online journal or an online album. In addition, user preferences could be applied so that only messages originating from a registered phone number would be able to be forwarded to the medial storage 218. Alternatively, user preferences could also be applied to allow messages from any originating phone number to be forwarded to the media storage 218.

In addition, the media storage 218 provides storage when messages could not be forwarded to the phone number for the destination mobile device. For instance, when the destination mobile device is not capable of receiving the message or parts of the message, the whole message and/or its parts could be forwarded for storage.

It is understood that any type of electronic messages addressed to a telephone, such as a text message, an SMS short text message, an Multimedia Messaging Services (MMS) message, a video message, a graphic message and an audio message, can be routed according to embodiments of the invention.

Figure 3:
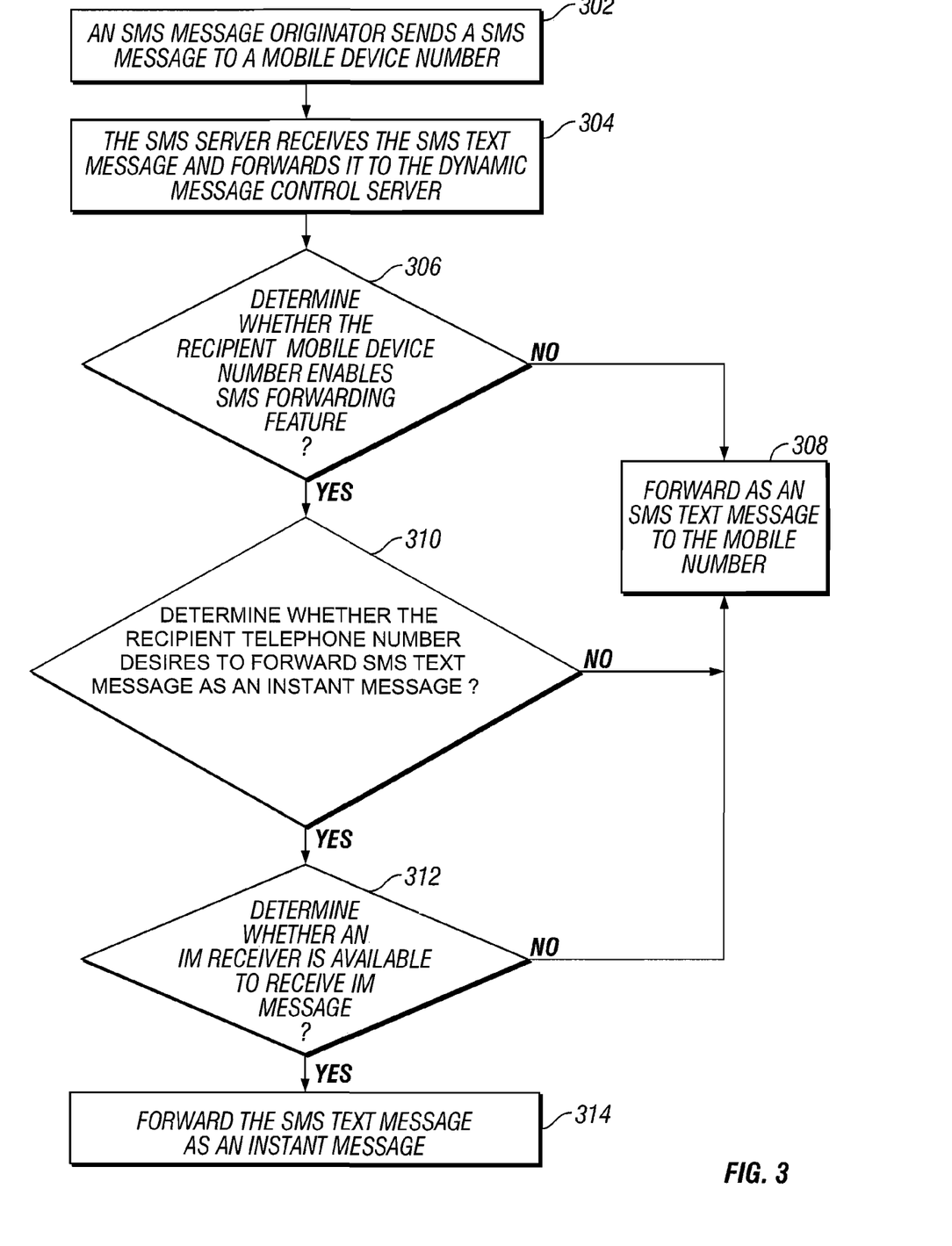
FIG. 3 is a block diagram showing a method of forwarding the SMS text message according to one embodiment of the invention.

FIG. 3 is a block diagram showing a method of forwarding the SMS text message according to one embodiment of the invention. Referring now to FIG. 3, the invention provides a method of forwarding an SMS text message addressed to a telephone number at either a mobile device in the SMS text message format or one or more IM message receivers displaying an IM message interface, depending upon whether there is an IM message receiver available to receive IM messages.

In one embodiment of the invention, the SMS text message recipient subscribes to both the SMS service and the IM service. At the time of the registration of the services, the recipient receives an SMS address, or has one already assigned, which is typically the telephone number of the mobile device number for the SMS service. For example, an SMS text message recipient Jane Smith is assigned an SMS text message address 650.555.1212, which is her mobile telephone number. A user of a mobile phone may send an SMS text message to the mobile phone of Jane Smith by specifying the phone number 650.555.1212 as the destination address. An email address, such as 6505551212@serviceprovider.com, may also be used for sending a text message from an email client program to the SMS center of the service provider for delivery as the SMS text message to the mobile device at the address of 650.555.1212.

Meanwhile, she registers a screen name representing her identity in an IM service system, e.g. JaneSmith1. When setting up her user profile, she associates her screen name of her IM service with the mobile device number of her SMS services. Thus, for example, the user profile database of the dynamic message control server associates the screen name "JaneSmith1" with the mobile device number 650.555.1212.

The user profile database may also associate her screen name with other profile information regarding the recipient, such as preferences of Jane Smith in routing SMS messages as instant messages. For example, she may specify user preference information that directs the determination process in forwarding SMS text messages as IM messages and user preference information for applying filters to forwarded messages. For example, the filters may include a SPAM filter, a rate-limiting filter, do-not-message list filters or even do-not-call list filters.

In one embodiment, the SMS text message sender instructs the SMS originator to send an SMS text message to a mobile device address that includes the mobile device number 302. The SMS server receives the SMS text message and forwards it to the dynamic message control server 304.

Subsequently, the dynamic message control server determines whether the recipient at the mobile device number has enabled the SMS forwarding feature 3046. The SMS text message is forwarded to the mobile device number directly 308 if it is determined that the recipient at the mobile device number did not enable the SMS forwarding feature 306.

If it is determined that the recipient at the mobile device number enabled the SMS forwarding feature 306, the SMS server proceeds to determine whether the recipient desires to forward the SMS message as an instant message 310 to the IM service address by checking against the user preference profile.

If it is determined that the recipient does not desire to forward the SMS message to as an instant message 310, the SMS text message is forwarded to the intended mobile device number at the mobile phone number 308.

If the recipient desires to forward the SMS message as an instant message 310, it is then determined whether an IM receiver is available to receive IM messages 312.

In one embodiment of the invention, it is dynamically determined whether the recipient's IM service receiver is available to receive an IM message 312. If it is determined that the recipient's IM service receiver is not available to receive an IM message 312, the SMS text message is forwarded to the intended mobile device address as the SMS text message 308. However, if it is determined that the recipient's IM service receiver is available to receive an IM message 312, the SMS text message is forwarded as an instant message to the recipient's IM display interface for delivery 314. Various features can be implemented in forwarding the SMS message as the IM message. These features are discussed below in connection with their respective figures.

In one embodiment, the recipient's IM display interface is on a computer terminal. In another embodiment, the recipient's IM display interface is on a mobile device such as a PDA or a mobile telephone. Once the instant messaging interface is initiated, the information for establishing the real-time or near real-time communication with the IM message receiving device is sent to an IM server so that IM messages can be delivered in real time or near real time.

In one embodiment of the invention, the IM user can also respond to the sender of the SMS message, which is forwarded to the SMS user as an SMS message, using an IM forwarding to the SMS service 314. For example, the server which forwards the SMS message to the IM receiver is aware of the source of the SMS message. When the IM receiver responds to the sender of the SMS message by an IM message, the server automatically converts the IM message into an SMS message for delivery to the sender. When this SMS message is delivered to device used by the SMS text message sender, it would appear to originate from the phone number originally addressed.

In one embodiment, the invention provides a method of logging the date and time for the delivery of the message to email addresses, the instant message identifiers or the storage medium. The method also provides a method of forwarding the electronic messages to a storage medium that temporarily or permanently stores the electronic messages. The messages can be forwarded according to the time and date preferences of the instant message receiver.

In this way, the invention bridges the gap between the two worlds of the SMS services and the IM services. The invention enables an IM service subscriber to bring the SMS service to the IM service community. The SMS text messages can be received as instant messages routed to IM service clients on which she is signed onto as determined by the IM server in a dynamic real-time fashion.

Meanwhile, an SMS text message sender with an SMS-enabled mobile phone would not have to learn anything new, as unfamiliarity with a new technology may become an obstacle for some users. By virtue of sending an SMS text message to a mobile device number that happens to be registered for an SMS text messaging to Instant Message forwarding feature, an SMS text message user can communicate with an IM user who is present on the Internet via the IM user interface.

Moreover, someone who uses both Instant Messaging and SMS can maintain contact with those who only know him by his mobile phone number; they would not have to know his IM identity. They could simply send a SMS text message to the mobile phone number.

The invention facilitates domain sharing with wireless carriers and provides a method of automatically absorbing a large amount of wireless telephone service customers when they sign on IM services. For example, if a wireless telephone service customer's telephone number is now registered with IM services with an IMS screen name, the wireless telephone number would automatically become eligible for IMS message forwarding services. Thus, the IMS subscriber is able to go online through an IM client, receive an IM message and receive an SMS text message sent to the wireless telephone number.

Figure 4:
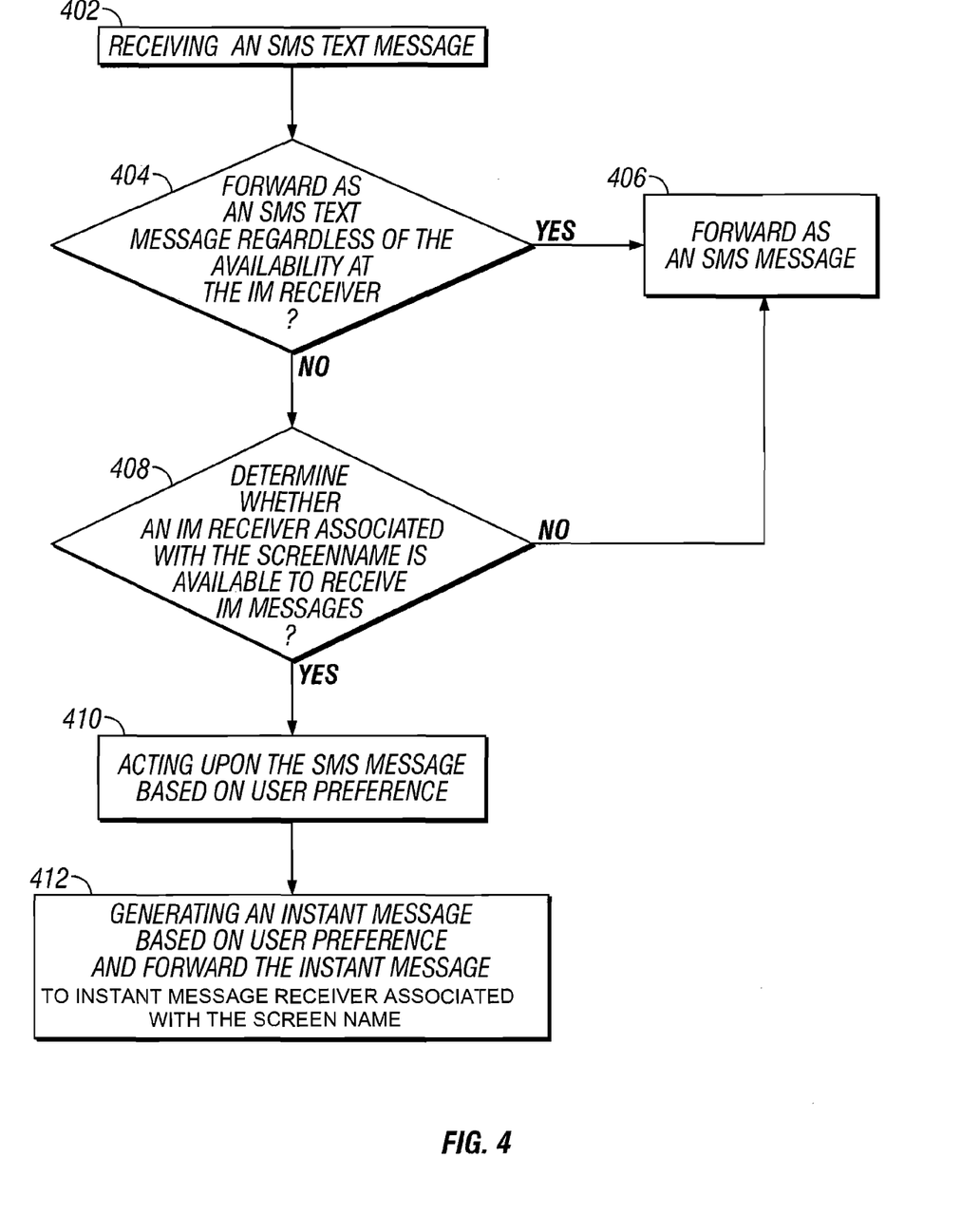
FIG. 4 is a block diagram showing a method of selectively forwarding electronic messages based on user preferences according to one embodiment of the invention.

FIG. 4 is a block diagram showing a method of selectively forwarding electronic messages based on user preferences according to one embodiment of the invention. A variety of actions can be taken when forwarding the electronic messages based on user preference according to embodiments of the invention. For example, the user can choose whether or not the SMS messages shall be forwarded and where the SMS message should to be forwarded to. The user preference may be set when registering an SMS service or an IM service or changed later.

Referring now to FIG. 4, after an SMS text message addressed to a telephone number is received 402, the dynamic message control server determines whether to forward the SMS text message regardless of the availability of the IM receiver based on user preference 404. If it is determined that the SMS text message shall be forwarded as an SMS text message regardless of the availability of the IM receiver based on user preference 404, the SMS text message is thus forwarded to the mobile phone of the addressed telephone number as an SMS text message without sending it as an instant message 406. In effect, the IMS service is blocked with regard to the SMS text message sender.

If it is determined that the SMS text message shall not be forwarded as an SMS text message regardless of the availability of the IM receiver based on user preference 404, the dynamic message control server then detects whether a receiver of the instant message identifier associated with the telephone number is available to receive instant messages 408.

If it is determined that the receiver of the instant message identifier associated with the telephone number is not available to receive instant messages 408, the SMS text message is forwarded to the addressed telephone number as an SMS text message without sending it as an instant message 406. However, if it is the receiver of the instant message identifier associated with the telephone number is available to receive instant messages 408, the SMS text messages is forwarded to the receiver of the instant message identifier based on the user preference 410.

In this way, an IMS user controls whether or not she wants to receive an SMS text message as an instant message.

An instant message is thus generated and forwarded to the instant message receiver of the instant message identifier, such as a screen name 412. In one embodiment, the recipient of the SMS text message may choose to use one specific user interface to receive messages and manage her conversations. A variety of the electronic devices can be configured to display the IMS user interface. Such electronic devices include but not limited to a computer terminal, a personal data assistant (PDA), a mobile or wired telephone receiver or other mobile devices. After the user uses the selected device for receiving instant messages, e.g. by starting the software program for the user interface and connecting to an instant message server using the screen name, the selected device becomes available to receive instant messages.

For example, Jane Smith can sign onto her computer to enjoy the rich messaging experience that an IM service client provides. The IM client can group messages from the same person within one window. When an SMS text message can be forwarded to an IM service client, the SMS text message recipient can sign onto an IM interface to receive the SMS text message using the IM service client, providing a better experience than an SMS text message interface while including some of the same functionality, e.g. grouping messages from the same person into a conversation.

Figure 5:
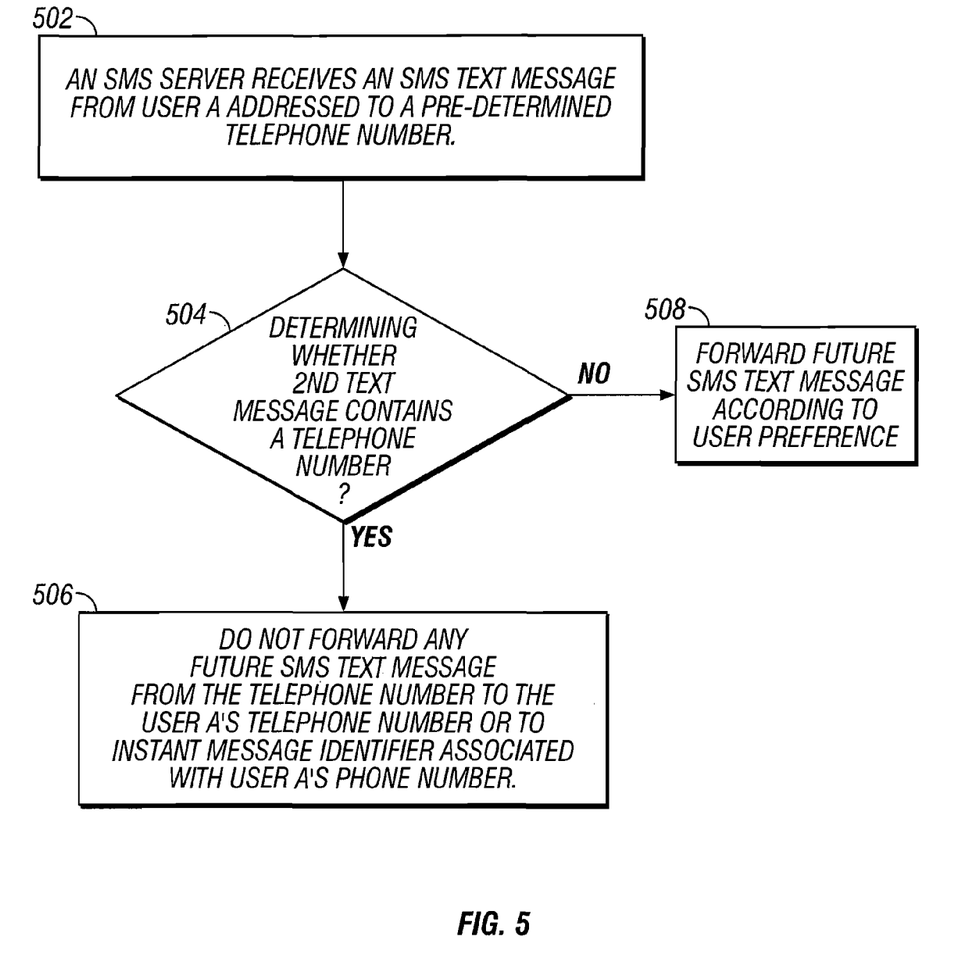
FIG. 5 is a block diagram showing a method of receiving the SMS text message with a privacy feature according to one embodiment of the invention.

FIG. 5 is flow diagram showing a method of receiving the SMS text message with a privacy feature according to one embodiment of the invention. User A receives from and sends SMS text messages to User B using mobile devices. Subsequently, User A wants to stop receiving messages from User B. The invention provides a method of discontinuing receiving SMS text messages from an undesired source.

Referring now to FIG. 5, User A may use a pre-determined telephone number that is available to all SMS forwarding subscribers who want to use the privacy feature. User A may send a text message containing User B's telephone number to the pre-determined telephone number to discontinue receiving SMS text messages from User B's telephone number.

In one embodiment, an SMS server receives an SMS text message originated from User A addressed to a pre-determined telephone number 502. It is determined whether the SMS text message originated from User A contains a telephone number 504, e.g. User B's telephone number. If it is determined that the SMS text message originated from User A contains User B's telephone number, any future SMS text message from User B's telephone number to User A's telephone number, will not be forwarded to the User A's telephone number or the instant message identifier associated with User A's telephone number 506. Thus, the future SMS text messsage from User B to User A will be blocked. In effect, User B's SMS text message intended to reach User A falls on a "deaf ear."

Alternatively, the unwanted messages may be forward to a storage media for permanent storage.

In another embodiment, User A uses a computer to create a list of telephone numbers to block. In this case, all unwanted messages from the telephone numbers on the block lists are blocked.

In one embodiment, the "deaf ear" telephone number generates an SMS text message as an automatic response stating that the recipient of the original SMS text message, e.g. User A, no longer wants to receive future messages from the sender, e.g. User B.

However, if it is determined that the SMS text message originated from User A does not contain User B's telephone number 504, the SMS text message is forwarded according to user preference 508.

In this way, the invention provides a method of blocking any future messages originating from a specified telephone number to the telephone number of a user, or the instant message identifier associated with that user's telephone number. Similarly, User A may choose to block future instant messages originated from the screen name associated with the telephone number of User B by sending the telephone number of User B in an SMS message to a predetermined telephone number.

Figure 6:
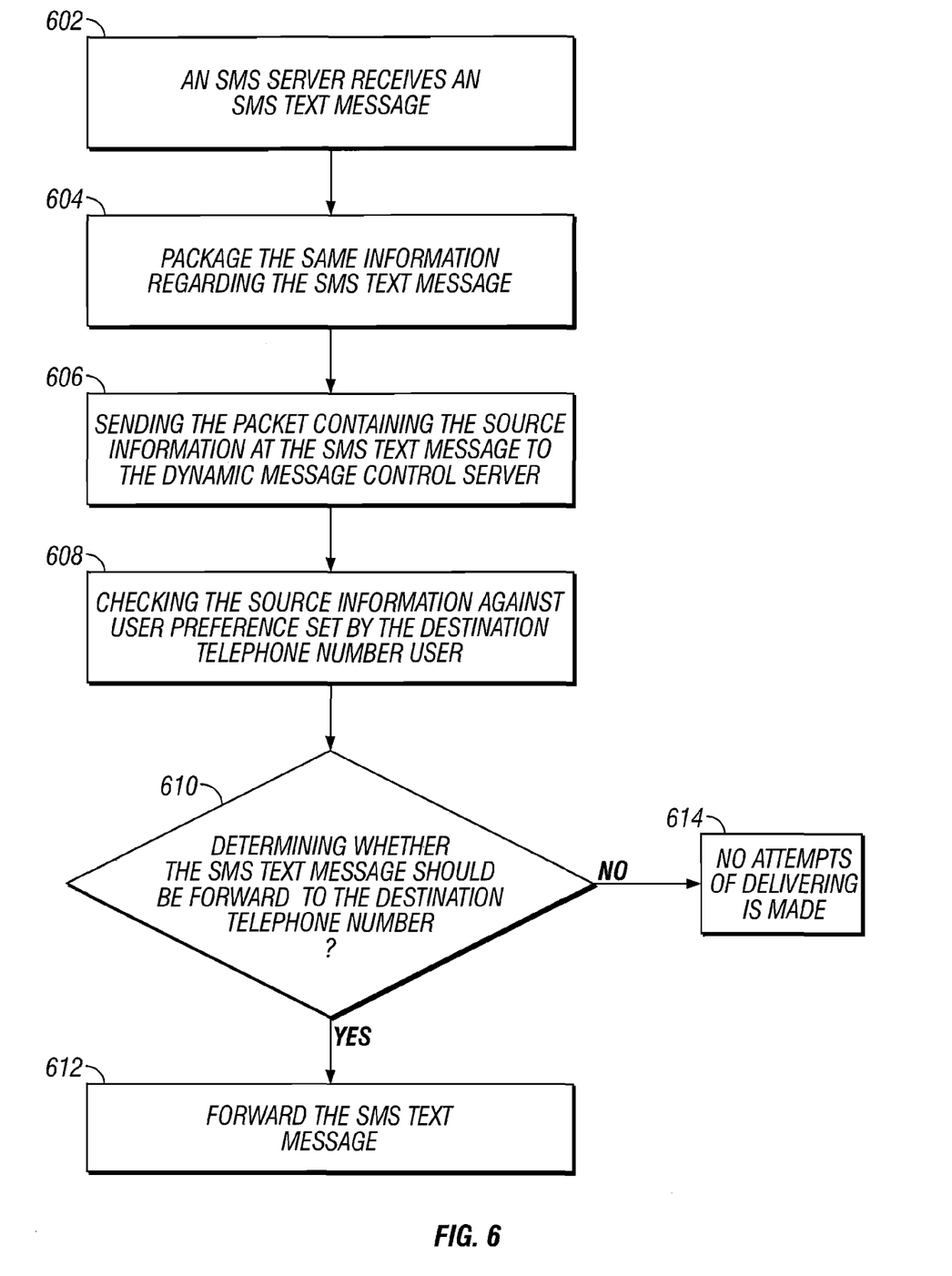
FIG. 6 is a block diagram showing a method of selective forwarding SMS text messages according to one embodiment of the invention.

FIG. 6 is a flow diagram showing a method of selective forwarding SMS text messages according to one embodiment of the invention. The invention provides a method of selectively forwarding SMS text messages according to its source information. The present invention brings the IMS functionality to the SMS Service.

Referring now to FIG. 6, in one embodiment, once the SMS server receives an SMS text message 602, the source Information about the originating and the destination telephone numbers of the SMS text message is packaged 604. Without sending the SMS text message itself, the packet including the source information of the SMS text message is sent to the dynamic message control server 606. Once received by the dynamic message control server, the content of the packet is checked against the user preference 608.

In one embodiment, the user preference can be set by the destination telephone number user or the parents who excise parental control of a teenager user. For example, a destination telephone number user can indicate in the user preference that an SMS text message originated from a specific telephone number should be blocked. In this case, the dynamic message control server checks if the packet for the destination telephone number includes a specified telephone number. If it does, the message is blocked or filtered according to the user preference.

It is then determined whether the SMS text message should be forwarded or not to the destination telephone number 610. If it is determined that the SMS text message can continue on to its destination, then the SMS text message is delivered to the SMS-enabled mobile phone or an IMS receiver 612. Alternatively, if it is determined that the SMS text message should not continue on to its destination, no attempts of delivery of the SMS text message is made 614.

In one embodiment, a user can choose to block all other SMS text messages forwarding but allow only certain types of SMS text messages to reach the mobile phone or the IMS receiver according to the source information. For example, a user may register the preference to receive SMS text message from only two sources, e.g. the telephone numbers from the user's parents and from the user's boss. Alternatively, a user may register the preference to receive all SMS text messages except one or more specified source telephone numbers.

Figure 7:
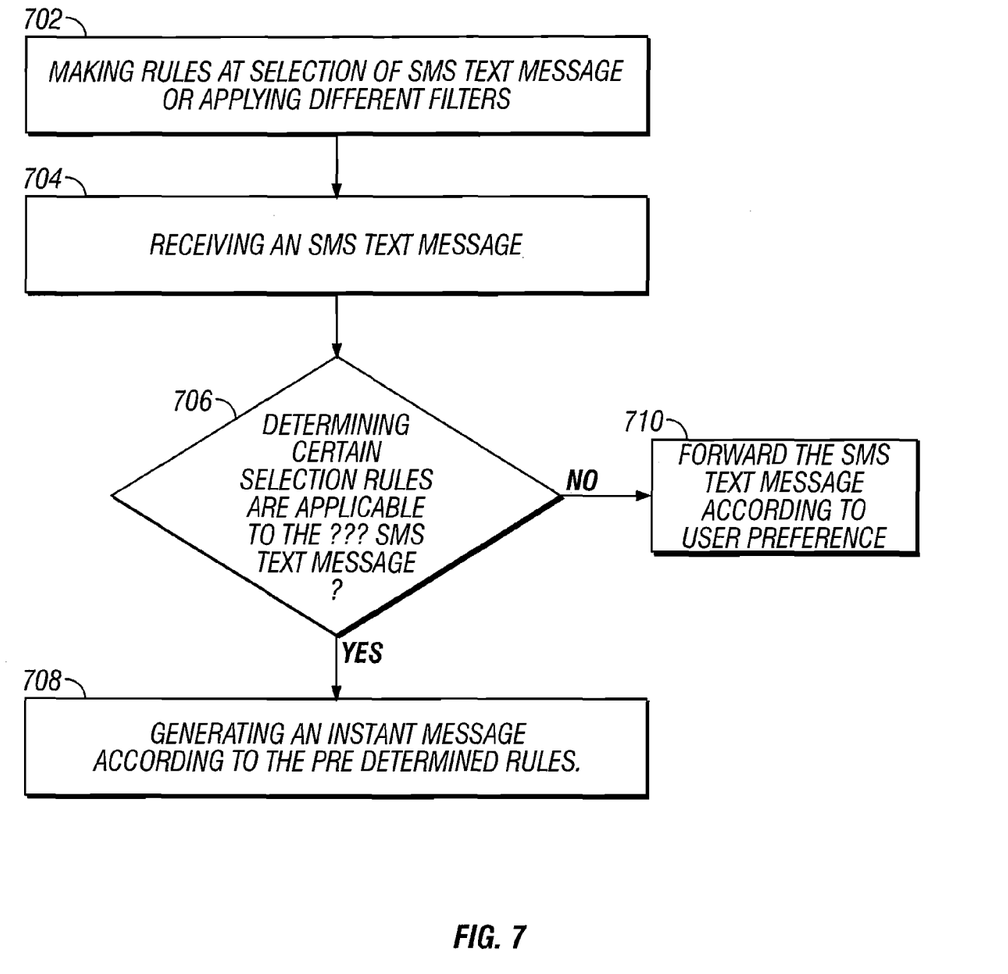
FIG. 7 is a block diagram showing a method of forwarding SMS text messages according to one embodiment of the invention.

FIG. 7 is a block diagram showing a method of forwarding SMS text messages according to one embodiment of the invention. The invention provides a method of forwarding SMS text messages according to predetermined rules.

Referring now to FIG. 7, in one embodiment, at least one user preference is provided to allow a user to register and make rules of forwarding the SMS text messages 702. One or more specific undesired words may be entered into a database that are available to be checked against later. For example, a user may make rules of deleting specific words of profanity from all incoming SMS text messages before the messages are forwarded as instant messages or delivered to the telephones as SMS text messages; or messages may be blocked from being forwarded at all. In another example, a user may choose to delete specific words or sentences or paragraphs suggesting illegal drugs from all incoming SMS text message. In another embodiment, a user may choose to apply different filters that are provided by the system. The various filters make the rules of forwarding the SMS text messages.

After the SMS server receives an SMS text message 704, the contents of an SMS text message are checked against the target words and a determination is made whether certain selection rules are applicable to the incoming SMS text message 706. In one embodiment, a search is performed to determine whether the SMS text message include target words stored in a database. Once a determination that certain selection rules are applicable to the incoming SMS text message 706, a new message is generated according to the predetermined selection rules 708. For example, the undesired target words originally in the SMS text message are deleted; and an instant message without the target words is generated.

If no selection rules are applicable to the incoming SMS text message 706, the SMS text message is forwarded in its original content according to user preferences.

In this way, the invention provides a method of parental control to allow parents to supervise a minor's use of SMS message systems.

Figure 8:
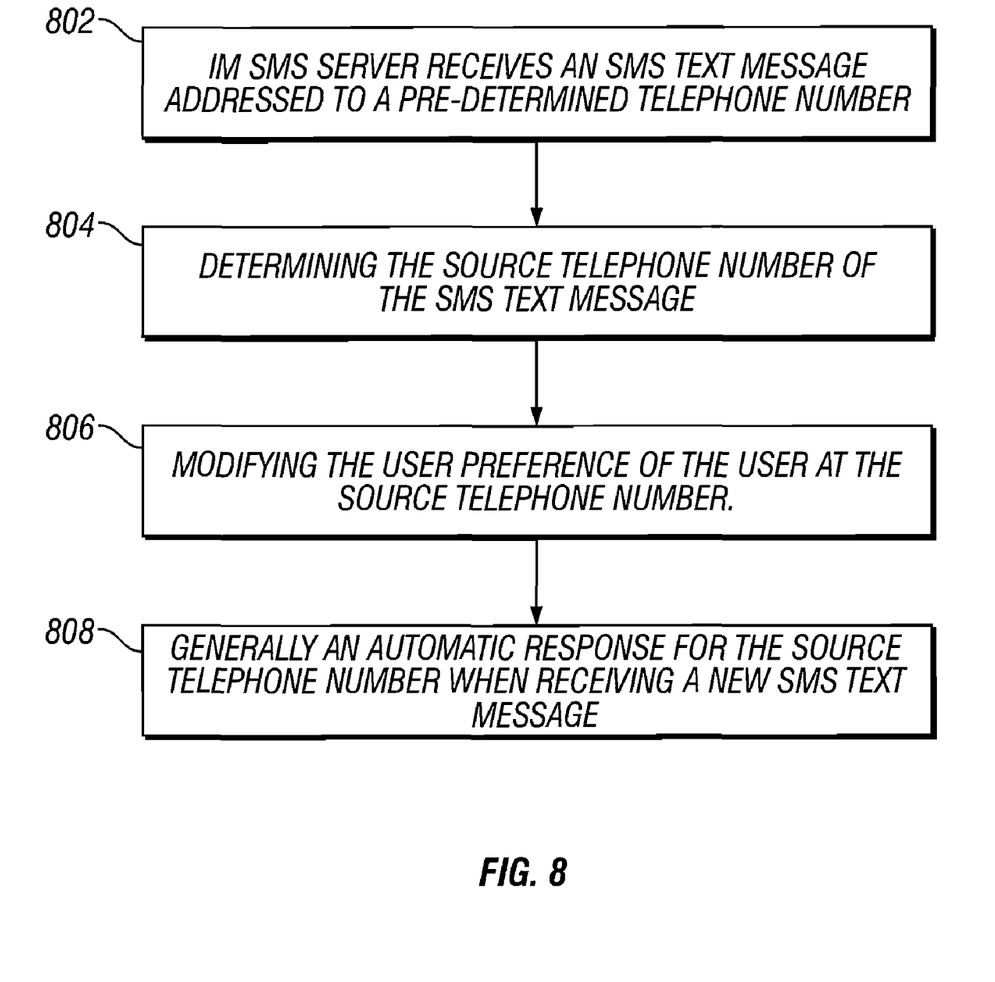
FIG. 8 is a block diagram showing a method of forwarding SMS messages according to one embodiment of the invention.

FIG. 8 is a block diagram showing a method of forwarding SMS messages according to one embodiment of the invention. The invention provides a method of generating an automatic response in response to an SMS text message.

Refering now to FIG. 8, User A has been using short message service (SMS) to send and receive SMS text messages from and to his mobile phone. Subsequently, User A wants to automatically generate a response to other users who send him a message. User A sends a text message containing the automatic response to a pre-determined phone number, e.g. the message "Gone Fishin'" sent to a predetermined telephone number "*99" or "4699.

In one embodiment, after an SMS server receives an SMS text message addressed to a predetermined telephone number 802, the dynamic message control server determines the source telephone number of the SMS text message 804. Based on the source telephone number information, the preferences of the user of the source telephone number is modified 806 so that an automatic response is generated for any future SMS text messages addressed to the source telephone number. For example, when the SMS server receives the SMS text message "Gone Fishin'" from User A, the telephone number associated with User A is determined and the preference of User A is modified so that the server will generate an automatic response to future SMS text messages addressed to the telephone number.

For example, when an incoming SMS message is determined to be addressed to the telephone number that requires an automatic response, an SMS text message containing the automatic response is generated 808. The context of the SMS message from the telephone number that requests the automatic response service, e.g. User A's telephone number, may be used to generate the automatic response. For example, after User A sends a text message of "Gone fishin'" to a predetermined telephone number "*99" or "4699, any text message addressed to the telephone number of User A will be automatically responded with the automatic generated response text message "Gone fishin," which is the text equivalent of a voicemail greeting/auto-reply for User A.

Thus, this action initiates the capability to generate the automatic response. Optionally, a particular status may be associated with this automatic response, which could be displayed on devices that support the display of such status.

Although the above embodiments and examples are described in a particular combination and flow order, different combinations and different orders of processing steps can be used. Some user preferences can be shared or derived from other products and preferences.

Alternatively, some additional user preferences can be set to condition the message delivery to the instant message receiver based on time and dates. For instance, in FIG. 7, there could be a pre-determined rule stating that within a certain time period, e.g. 12:00 am-6:00 am, and/or within a date range, e.g. Dec. 25, 2003-Jan. 1, 2004, messages would not be forwarded either to the instant message receiver and/or the mobile device. Additionally, the user may be able to specify an auto-response, as shown in FIG. 8, during this period.

In one embodiment, message delivery could also be dependent on community-wide SPAM rules that go beyond user preferences. For instance, if the originating phone number violates any community wide rules, has been excommunicated from the community, or has sent too many messages within a period of time (i.e., rate-limiting), the phone number may be put on a list of phone numbers. If a phone number is on this list, the Dynamic Message Control Server would not deliver messages originating from this phone number to any destination device. Similarly, destination phone numbers may opt to be on a "Do Not Message" list, akin to the "Do Not Call" List. In effect, if the destination phone number is on the list, messages from certain originating phone numbers would not be delivered to the destination phone number.

In one embodiment, a log of messages could be created by the Dynamic Message Control Server regardless of how a message is forwarded. For instance, if the message is forwarded to the mobile device number directly like in 308, then this action is recorded in the log. This log would be accessible by an administrator tool which would be part of the dynamic message control server.

It can be appreciated that the present invention can be implemented on the SMS-C server or can be implemented on separate servers, such as an IM server. A dynamic message control server can be included in the SMS-C server A routing logic can be implemented independent of the SMS server with the dynamic message control server.

It is important to note that embodiments of the methods can be further used with other types of electronic messages. Other types of electronic messages include any type of electronic messages capable of being delivered and received by SMS/MMS-enabled and/or IMS-enabled electronic devices, such as a text message, an MMS message, a video message and an audio message etc. An SMS-enabled and IMS-enabled electronic devices include a computer, a personal data assistant (PDA), a mobile or wired telephone receiver or other electronic devices.

It is also important to note that embodiments of the invention include an apparatus for transmitting an electronic message according to the methods described above and a program storage medium readable by a computer, tangibly embodying a program of instructions executable by the computer to perform the method for updating address information as described above.

Although the invention is described herein with reference to the preferred embodiment, one skilled in the art will readily appreciate that other applications may be substituted for those set forth herein without departing from the spirit and scope of the present invention. Accordingly, the invention should only be limited by the claims included below.

The invention claimed is:

1. A method of transmitting electronic messages in a computer environment, comprising the steps of:
   receiving an original electronic message addressed to a telephone number;
   determining an instant message identifier associated with the telephone number;
   determining in real time whether an instant message receiver is currently available to receive messages addressed to the instant message identifier; and
   performing a step from a group of steps consisting of:
      forwarding the electronic message as an instant message addressed to the instant message identifier in response to a determination that an instant message receiver is available to receive instant messages addressed to the instant message identifier; and
      sending the electronic message to a mobile device at the telephone number in response to a determination that no instant message receiver is available to receive instant messages addressed to the instant message identifier.

2. The method of claim 1, wherein the electronic message comprises any of:
   a text message, an SMS text message, an MMS message, a video message, and an audio message.

3. The method of claim 1, wherein the instant message is received at an electronic device configured to receive instant messages addressed to the instant message identifier.

4. The method of claim 3, wherein the electronic device comprises any of: a computer, a personal data assistant (PDA), and a telephone receiver.

5. The method of claim 1, wherein the step of determining an instant message identifier comprises searching for the instant message identifier associated with the telephone number in a database.

6. The method of claim 1, further comprising the step of:
   determining whether or not to forward the electronic message as an email message addressed to an email address according to a user preference stored in a database.

7. The method of claim 1, further comprising the step of:
   determining whether or not to forward the electronic message as an instant message addressed to the instant message identifier according to a user preference stored in a database.

8. The method of claim 7, wherein the step of determining whether or not to forward is further based on source information of the electronic message.

9. The method of claim 8, wherein the source information comprises any of:
   a source address of the electronic message, a user name of a sender of the electronic message, a telephone number of a sender of the electronic message, and an instant message identifier of a sender of the electronic message.

10. The method of claim 1, wherein the instant message is generated from the electronic message based on one or more predetermined rules.

11. The method of claim 10, wherein the one or more predetermined rules select one or more portions of the electronic message as the instant message.

12. The method of claim 10, wherein the one or more predetermined rules selectively delete one or more portions of the electronic message to generate the instant message.

13. The method of claim 1, further comprising the step of forwarding the electronic message to a storage medium.

14. The method of claim 1, further comprising the step of storing the electronic message in a storage medium.

15. The method of claim 1, further comprising the step of:
   determining whether or not to forward the electronic message to a storage medium according to a user preference stored in a database.

16. The method of claim 15, wherein the step of determining whether or not to forward is further based on source information of the electronic message.

17. The method of claim 15, wherein the user preference stored in the database comprises date and time preference of the instant message receiver.

18. The method of claim 1, further comprising the step of:
   forwarding the electronic message to a storage medium when forwarding the electronic message to an email address and to an instant message identifier fail.

19. The method of claim 1, further comprising the step of logging the forwarding of the electronic message.

20. The method of claim 1, further comprising blocking the forwarding of the electronic message based on a list of telephone numbers.

21. The method of claim 1, wherein forwarding is based on one or more predetermined rules.

22. An apparatus for transmitting electronic messages in a computer environment, comprising:
   a mobile device for receiving an original electronic message addressed to a telephone number;
   a dynamic message control server for determining an instant message identifier associated with the telephone number;
   the dynamic message control server for determining in real time whether an instant message receiver is currently available to receive messages addressed to the instant message identifier;
   the dynamic message control server for forwarding the electronic message an instant message addressed to the instant message identifier in response to a determination that an instant message receiver is available to receive instant messages addressed to the instant message identifier; and
   the dynamic message control server for sending the electronic message to a mobile device at the telephone number in response to a determination that no instant message receiver is available to receive instant messages addressed to the instant message identifier.

23. The apparatus of claim 22, wherein the electronic message comprises any of:
   a text message, an SMS text message, an MMS message, a video message, and an audio message.

24. The apparatus of claim 22, wherein the instant message is received at an electronic device configured to receive instant messages addressed to the instant message identifier.

25. The apparatus of claim 24, wherein the electronic device comprises any of:
   a computer, a personal data assistant (PDA), and a telephone receiver.

26. The apparatus of claim 22, wherein the module for determining the instant message identifier further comprises a module for searching for the instant message identifier associated with the telephone number in a database.

27. The apparatus of claim 22, further comprising:
   a module for determining whether or not to forward the electronic message as an email message addressed to an email address according to a user preference stored in a database.

28. The apparatus of claim 22, further comprising:
   a module for determining whether or not to forward the electronic message as an instant message addressed to the instant message identifier according to a user preference stored in a database.

29. The apparatus of claim 28, wherein the module for determining whether or not to forward the electronic message is further configured for determining whether or not to forward based further on source information of the electronic message.

30. The apparatus of Claim 29, wherein the source information comprises any of:
   a source address of the electronic message, a user name of a sender of the electronic message, a telephone number of a sender of the electronic message, and an instant message identifier of a sender of the electronic message.

31. The apparatus of claim 22, further comprising a module for generating the instant message from the electronic message based on one or more predetermined rules.

32. The apparatus of claim 31, wherein the module for generating the instant message is further configured to use the one or more predetermined rules to select one or more portions of the electronic message as the instant message.

33. The apparatus of claim 31, wherein module for generating the instant message is further configured to use the one or more predetermined rules to selectively delete one or more portions of the electronic message to generate the instant message.

34. The apparatus of claim 22, further comprising a module for storing the electronic message in a storage medium.

35. The apparatus of claim 22, further comprising a module for determining whether or not to forward the electronic message to a storage medium according to a user preference stored in a database.

36. The apparatus of claim 35, wherein the user preference stored in the database comprises at least date and time preference of the instant message receiver.

37. The apparatus of claim 22, further comprising a module for forwarding the electronic message to a storage medium when forwarding the electronic message to an email address and to an instant message identifier fail.

38. The apparatus of claim 22, further comprising a module for logging the forwarding of the electronic message.

39. The apparatus of claim 22, further comprising a module for blocking the forwarding of the electronic message based on a list of telephone numbers.

40. The apparatus of claim 22, wherein the module for forwarding the electronic message is further configured for forwarding the electronic message based on one or more predetermined rules.

41. A program storage medium readable by a computer, tangibly embodying a program of instructions executable by the computer to perform a method of transmitting electronic messages in a computer environment, the method comprising the steps of:

receiving an original electronic message addressed to a telephone number;

determining an instant message identifier associated with the telephone number;

determining in real time whether an instant message receiver is currently available to receive messages addressed to the instant message identifier; and performing a step from a group of steps consisting of:

forwarding the electronic message as an instant message addressed to the instant message identifier in response to a determination that an instant message receiver is available to receive instant messages addressed to the instant message identifier; and sending the electronic message to a mobile device at the telephone number in response to a determination that no instant message receiver is available to receive instant messages addressed to the instant message identifier.

42. The medium of claim 41, wherein the electronic message comprises any of:

a text message, an SMS text message, an MMS message, a video message, and an audio message.

43. The medium of claim 41, wherein the instant message is received at an electronic device configured to receive instant messages addressed to the instant message identifier.

44. The medium of claim 43, wherein the electronic device comprises any of:

a computer, a personal data assistant (PDA), and a telephone receiver.

45. The medium of claim 41, wherein the determining the instant message identifier comprises searching for the instant message identifier associated with the telephone number in a database.

46. The medium of claim 41, wherein the method further comprises the step of:

determining whether or not to forward the electronic message as an email message addressed to an email address according to a user preference stored in a database.

47. The medium of claim 41, wherein the method further comprises the step of:

determining whether or not to forward the electronic message as an instant message addressed to the instant message identifier according to a user preference stored in a database.

48. The medium of claim 47, wherein the determining whether or not to forward is further based on source information of the electronic message.

49. The medium of claim 48, wherein the source information comprises any of:

a source address of the electronic message, a user name of a sender of the electronic message, a telephone number of a sender of the electronic message, and an instant, message identifier of a sender of the electronic message.

50. The medium of claim 41, wherein the instant message is generated from the electronic message based on one or more predetermined rules.

51. The medium of claim 50, wherein the one or more predetermined rules select one or more portions of the electronic message as the instant message.

52. The medium of claim 50, wherein the one or more predetermined rules selectively delete one or more portions of the electronic message to generate the instant message.

53. The medium of claim 41, wherein the method further comprises a step for storing the electronic message in a storage medium.

54. The medium of claim 41, wherein the method further comprises the step of forwarding the electronic message to a storage medium when forwarding the electronic message to an email address and to an instant message identifier fail.

55. The medium of claim 41, wherein the method further comprises a step for determining whether or not to forward the electronic message to a storage medium according to a user preference stored in a database.

56. The medium of claim 55, wherein the user preference stored in the database comprises at least date and time preference of the instant message receiver.

57. The medium of claim 41, wherein the method further comprises a step for logging the forwarding of the electronic message.

58. The medium of claim 41, wherein the method further comprises a step for blocking the forwarding of the electronic message based on a list of telephone numbers.

59. The medium of claim 41, wherein the forwarding is based on the one or more predetermined rules.

* * * * *